United States Patent [19]

Borges

[11] 4,154,671
[45] May 15, 1979

[54] METHOD AND APPARATUS FOR RECYCLING UNDELIVERED CEMENT

[76] Inventor: Alfred R. Borges, 17112 "B" St., Huntington Beach, Calif. 92647

[21] Appl. No.: 797,784

[22] Filed: May 17, 1977

[51] Int. Cl.² .................... B07B 11/06; B01D 21/24
[52] U.S. Cl. .................... 209/10; 209/269; 209/317; 210/523; 210/532 R
[58] Field of Search .............. 209/2, 13, 17, 10, 18, 209/173, 269, 315, 317; 210/513, 523, 532 R

[56] References Cited

U.S. PATENT DOCUMENTS

| | | | |
|---|---|---|---|
| 2,522,556 | 9/1950 | Wuensch | 210/523 X |
| 3,113,733 | 12/1963 | Carlson | 209/17 X |
| 3,278,022 | 10/1966 | Moeschler | 209/17 X |
| 3,596,759 | 8/1971 | King et al. | 209/2 |
| 3,997,434 | 12/1976 | Macauley, Jr. | 209/10 |

*Primary Examiner*—William A. Cuchlinski, Jr.
*Attorney, Agent, or Firm*—Singer & Singer

[57] ABSTRACT

This invention describes apparatus and method for recycling undelivered cement left as residue in cement trucks. Undelivered cement at the end of the working day is deposited on a shaker screen under action of high pressure water jets which trap large aggregate and force the large aggregate onto a first belt for collection. Sand, cement and water fall through the first screen onto a second screen which traps sand under action of high pressure jets that force the sand onto a second belt for delivery to a collection area. The remaining cement, water and slurry is collected in a trough and pumped to a settling tank having an auger that periodically mixes the water and cement to prevent hardening. A skimmer located at the uppermost portion of the settling tank collects clear water used to clean the aggregate and cement previously mentioned. The cement, water and slurry collected in the settling tank is used in combination with fresh sand and cement to provide a fresh charge to waiting cement trucks. Sand, cement, water and aggregate previously lost is now recycled and reused rather than being wasted.

5 Claims, 4 Drawing Figures

METHOD AND APPARATUS FOR RECYCLING UNDELIVERED CEMENT

This invention relates to a method and apparatus for more efficiently recycling waste material in ready mix cement trucks.

In the art of delivering ready-mix cement to a job site it is customary for a cement truck having the necessary capacity to obtain a charge of rock, sand, cement and water at a cement yard as determined by the needs of the customer.

Present day yards are fully automated and require only the insertion of the kind of charge required and the amount of rock, sand, cement and water to produce the required charge. The automated equipment will supply the elements in the proper amounts and in accordance with these needs. The truck upon being filled with the ingredients is closed and driven to the job site with the back portion rotated at a given speed to insure a proper mixing of the elements by the time the truck arrives at the destination.

At the destination or job site the truck is maneuvered into a preferred position and the load discharged into suitable molds adapted to accept the mix of concrete. This process is repeated until the desired amount of mix is delivered or until the end of the working day.

For small projects, less than a full load may sometimes be used and the residue, if any, is brought back to the plant, at which time it is added to by subsequent mixing to supply the ingredients for the next delivery.

In the normal day to day operation of delivering a mix to a job site there is the problem of supplying enough mix to satisfy the needs of the customer. In addition, there is a problem at the close of the working day of how to handle the remaining residue left in the cement trucks.

Considering the operation of a normal yard having approximately 150 trucks, it will be appreciated that each truck at the end of the day having some overage that may vary from a half a yard to a yard or even two yards represents a problem of disposal since the material must be dumped and disposed of and the truck cleaned out for the next day's operation.

By assuming at least 75 trucks having an overage of at least one yard, it can be appreciated that 75 yards of concrete must be disposed of and that 150 trucks must be cleaned for the next day's operation.

In the past, some operators would simply charge their trucks with excess water and dump the remaining material in the sewer. This practice has been frowned upon by many local authorities and is now against the law in many communities.

The problems associated with cleaning 150 trucks have resulted in the enormous use of water just for flushing and cleaning purposes, which water was invariably discharged into the sewer and wasted.

The prior art did not really supply a solution to the handling of partial loads remaining in the cement trucks, however, certain procedures did develop in the industry which at best are unsatisfactory.

In some locales where the terrain permits, a cement truck at the end of the day would travel to a suitably located quarry or other area where the load could be dumped without objection and then returned to the yard for the ultimate washout procedures mentioned above.

This procedure, unfortunately, is expensive since the operator must pay for the cost of the truck being moved to the remote location and the return to the yard. In addition, the costs include the driver time and his charges covering the trip to the grounds and the return to the yard for cleanup procedures. It is quite obvious that the cost of operating the truck to the dump and return and the cost of the driver for this period of time is unproductive and in reality is dead time that must be borne by the operator.

As simple as the procedure sounds it has problems since available areas for dumping the unused charge at the end of the day are not readily available to the average operator. In addition, areas that are available are usually under private control requiring a charge of admission for the privilege of dumping the waste material. The added charge of admission to the dump area and the delay associated with the dumping procedure must all be added to the costs and the overhead of operation.

In considering the overall operation, it becomes quite apparent that the rock, sand, cement and water comprising the residual charges are all wasted and hence not available to the operator by way of reclamation or saving. The loss and resources of the material can only increase the cost of operation and the loss to the environment in accepting waste concrete is enormous each year, as dumping areas are gradually made unavailable to the concrete industry. The waste of natural resources can only be considered a disaster to the whole country and to the world.

The handling of excess waste has been attempted by private operators that allow cement trucks to enter their land and dump their waste charges into molds. The molds are allowed to harden and eventually fed to a cement breaking device which breaks the hardened concrete into small portions which is eventually sold to construction gangs as base fill for foundation and subfoundation projects.

The operator of a concrete truck must, however, pay the land owner for the privilege of entering and dumping his waste material. These operators are invariably located at the edge of town which again requires a long-distance drive for the truck operators at the end of the day to reach the dump site, pay for the entry, dump the material and return to the yard for the cleaning operation.

The most common and brute force technique for moving the excess material is to simply dump the excess on the ground at the job site. The operator then returns the truck to the yard for the cleaning operation.

Unfortunately, simply dumping the slurry onto the ground creates an obvious mess that is very difficult to handle or clean. The usual practice is to water down the slurry and ultimately bring in skip loaders which lift the cement mix onto dump trucks which carry the material to some disposal site.

There have been prior devices that have attempted to wash the mix, however, the problems associated with removing the cement from the water are enormous and the slurry resulting from allowing cement and water to stand for any period of time have created problems that the industry has not been able to solve until the advent of the present invention.

In this invention there is disclosed a method and apparatus for utilizing the residue charge remaining in cement trucks in a recycling apparatus that recovers the rock, the sand, and the slurry consisting of cement and water.

In the preferred embodiment there is provided a shaker having different size screen mesh and a high pressure water jet system for collecting and separating rock and sand and slurry from the residue cement. The vibrating shaker together with the action of the high pressure water jets separates the rock and sand from the cement and water. The uppermost screen being largest in size will hold the rock and the bottommost screen being smaller in size will hold the sand leaving the water and cement slurry to fall to the bottommost portion where the water and slurry consisting of water and cement is caught by a holding tank.

The water pressure forces the rock from the uppermost mesh onto a movable conveyor belt which carries the rock to a suitable storage bin. The water pressure forces the sand caught by the lowermost screen onto a second movable conveyor belt located below the first conveyor belt and which conveys the sand to a second storage bin.

The water and slurry is collected in the bottommost sump portion of the holding tank which contains an auger for feeding and mixing the slurry.

A suitable pump forces the slurry from the sump area of the holding tank into the uppermost portion of a settling tank having a preferred configuration resembling a funnel portion on the lowermost portion. The settling tank contains a centrally located auger that is adapted to periodically rotate to thereby lift the slurry through the water and keep the slurry in a fluid condition.

The output from the sump area of the holding tank continually feeds the settling tank which accumulates the fluid and slurry combination. The slurry eventually settles to the lowermost portion leaving the uppermost portion as a substantially clear and solid free liquid.

A skimmer is located on the uppermost portion in the area of the free liquid and is directly connected to the high pressure jets associated with the shaker mechanism previously described.

In operation, the driver of the cement truck dumps his residue load of cement on the shaker, energizes the shaker and the high pressure jet system which cleans the rocks, sand and slurry, and separates the rock from the sand causing the conveyor belts to store and stack the rock and the sand in the individual bin areas. At the same time the auger located in the sump area of the holding tank conveys the slurry into a pump for transfer to a settling tank where the slurry is separated from the water.

The reclaimed clear water from the skimmer is used to wash and separate the rocks from the sand and is also available to the cement truck operator to clean the cement truck before being returned to the yard.

The slurry is pumped from the funnel portion of the settling tank and is used as make-up water when creating a new charge for the cement truck. The slurry and water serve the purpose of the water charge needed by the cement truck when receiving a new charge of sand, cement and stone.

The portable and mobile material washer comprising this invention may be located either at the job site or at the yard where the cement truck receives a new charge.

Further objects and advantages will be made more apparent by referring to the accompanying drawings.

Figure 1:
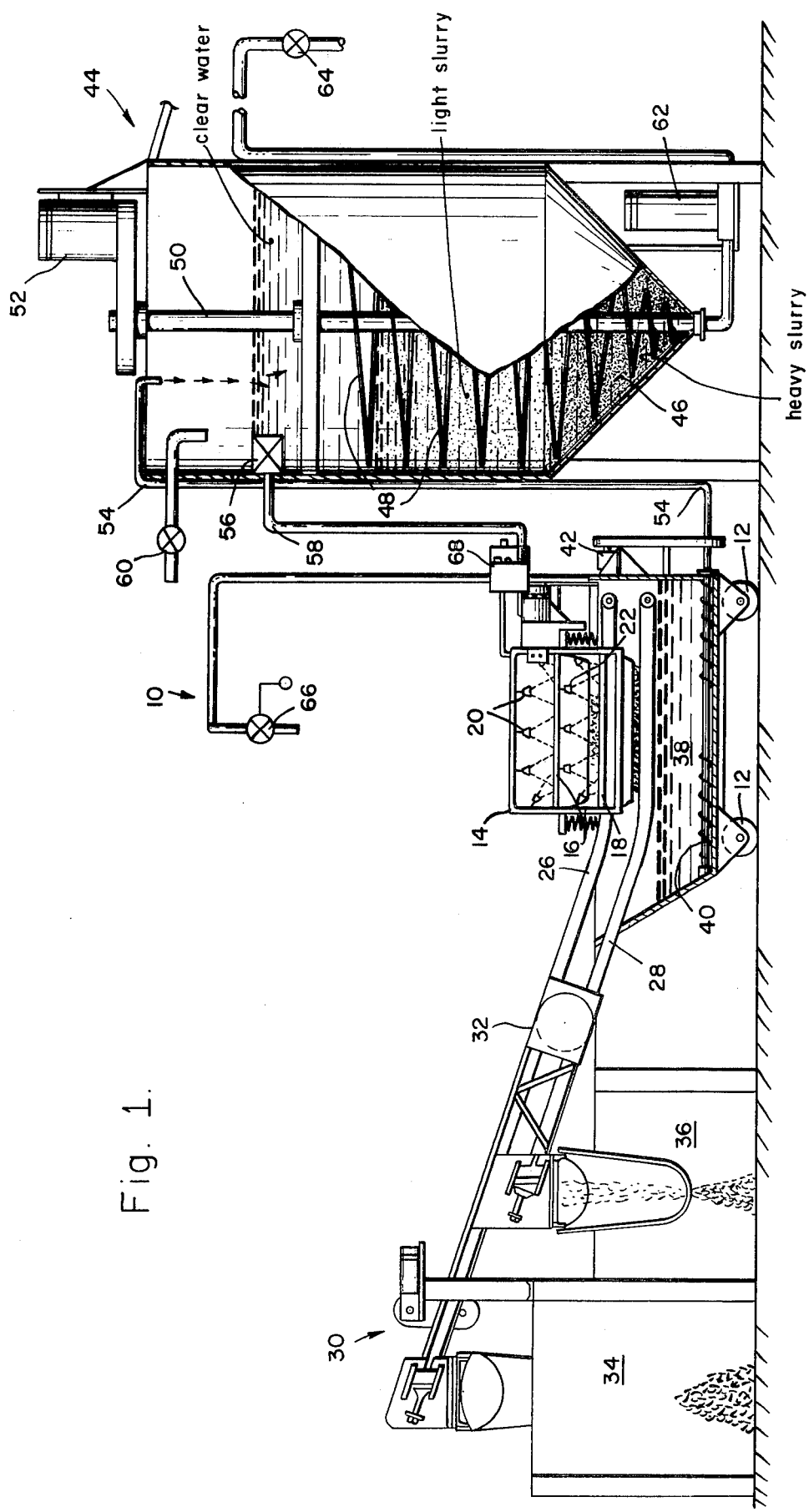
FIG. 1 illustrates a partial cross-sectional view of the complete system for recycling stone, sand and slurry from cement trucks.
Figure 2:
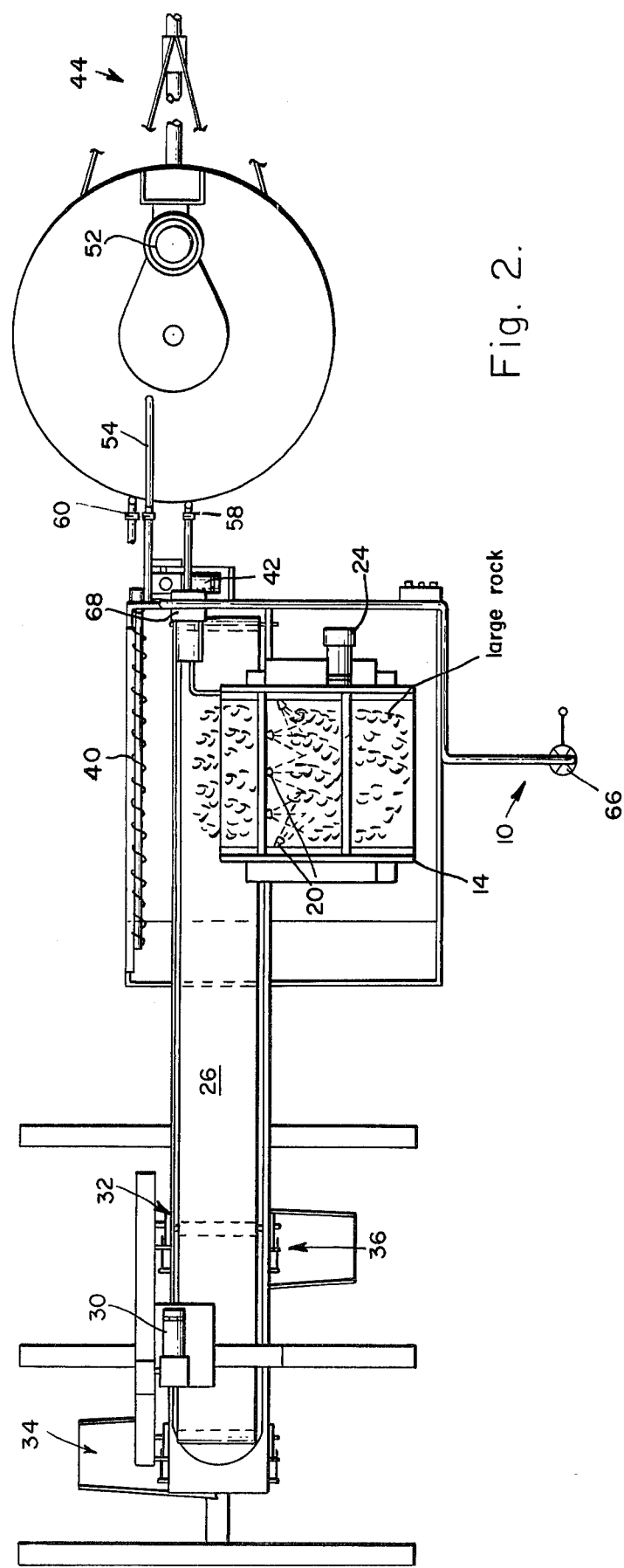
FIG. 2 illustrates a top view of the system illustrated in FIG. 1.
Figure 3:
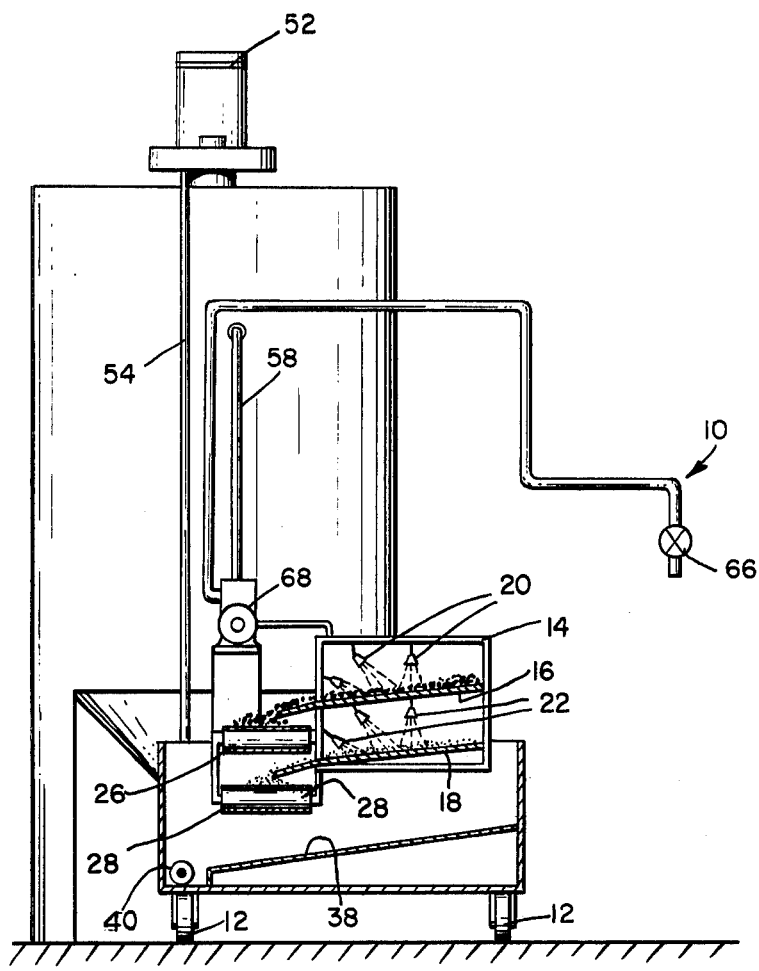
FIG. 3 illustrates a side view of the holding tank illustrated in FIGS. 1 and 2.

Referring now to FIGS. 1, 2 and 3, there is shown the basic components comprising the essential elements forming a system for recycling rock, stone, water and slurry from off-loaded cement trucks. The equipment may be located either on the job site where the pouring is done or at the yard where the original batch of concrete is supplied to the cement trucks.

The equipment is actually constructed to be mobile and portable and therefore capable of being moved as dictated by external considerations affecting the economy of operation.

In the preferred embodiment a holding tank 10 located on rollers 12 and adapted to be moved about contains a mechanical shaker system 14 physically attached to a pair of screens 16 and 18, located one above the other. Screen 16 has a large mesh for accepting and holding large rock aggregates used in cement, whereas screen 18 contains a smaller mesh opening for holding sand.

Associated with shaker system 14 is a series of high pressure jets 20 and 22 associated with screens 16 and 18, respectively.

In operation the cement truck off-loads the residual cement onto the uppermost screen 16 associated with the shaker system 14. The shaker system 14 is vibrated by motor 24 associated with the shaker system in order to provide a vibratory oscillating action to both screens 16 and 18. The high pressure jets 20 and 22 are activated at the same time that the shaker system 14 is energized by the motor 24.

Screen 16 contains a substantially large mesh opening suitable to hold the largest rock aggregate used in the cement. Screen 18 has a smaller mesh opening adapted to hold the sand forming part of the cement load.

The load of cement resting on screen 16 is agitated by means of the motor 24 and cleaned by means of the high pressure jets 20. The action of the high pressure water jets washes the rock aggregate from the sand and cement which is free to pass through the screen 16 and onto the screen 18. The high pressure fluid from the jets 20 forces the rocks being held by screen 16 over to one side where the rocks are caught by endless conveyer belt 26 more fully illustrated in FIG. 2.

The remaining sand, cement and water falls through the mesh associated with the screen 16 and is caught by the smaller mesh screen 18. The continuing vibrating of the shaker system 14 by the shaker motor 24 together with the high pressure jets 22 cleans the cement and water from the sand which is held by screen 18. The continuing force of the high pressure water from jets 22 force the sand to one side where it is caught by an endless moving belt 28, which is more fully illustrated in FIG. 2.

The endless belts 26 and 28 are controlled by a belt moving system 30 that is adapted to pivot about a pivotal point 32 located on one side of the holding tank 10. The pivot point 32 provides a convenient means for the belt mechanism 30 to be pivoted and held in place when the holding tank 10 is moved from location to location.

In the operating position the belt moving mechanism 30 will be located in an outward extending position at a slight angle to the ground in order to provide the track for the individual belts 26 and 28 away from holding tank 10.

In the preferred embodiment, belt 26 adapted to collect the rock aggregate will be located further away from the holding tank 10 and at the highest point will feed the rock into a bin area 34, whereas belt 28 located below belt 26 will carry the sand to a second bin area 36 thereby providing a convenient area where the rock and the sand are individually collected and separated from each other.

A review of the operation will show that the shaker system 14 in cooperation with the high pressure fluid emanating from jet 20 will clean the rock on screen 16 and force the rock onto belt 26 for ultimate disposal in bin 34. Similarly the high pressure fluid emanating from jet 22 will clean the sand located on screen 18 and force the sand onto belt 28 for ultimate disposal in bin 36.

The resulting slurry formed by the liquid and cement will filter through screen 18 to the lowermost portion of the holding tank 10, which is adapted to form a sump area 38 for collecting the slurry consisting of the water and concrete.

An auger 40 is located in the sump area 38 and is adapted to be driven by motor 42 which has the effect of continuously forcing the slurry through a suitable port for pumping purposes.

Associated with the holding tank 10 and located in close proximity is a settling tank 44. In the preferred embodiment the settling tank 44 has a sump area 46 located in the bottommost portion formed in the shape of a funnel. Centrally located within the settling tank 44 is auger 48 complementing the shape of the settling tank on the uppermost portion and the shape of the funnel portion in the sump area 46.

Figure 4:
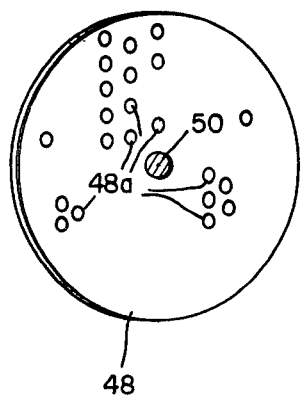
FIG. 4 illustrates the auger located in the settling tank.

The auger 48 is more fully illustrated in FIG. 4 and contains holes 48a for allowing water to keep the slurry wet. A central shaft 50 adapted to be rotated by motor 52 is located on the uppermost portion and on the outside of the settling tank 44. Motor 52 is controlled by a timing switch to rotate approximately 15 minutes every two hours to thereby cause the slurry within the settling tank 44 to be lifted through the liquid located within the settling tank and thereby prevent and delay hardening action of the cement and water forming the slurry.

The settling tank 44 receives the slurry mixture from the holding tank 10 by means of suitable pumps associated with connecting pipes 54 which directly connect the output of the sump area of the holding tank to the uppermost portion of the settling tank 44. In this manner liquid and slurry formed in the bottommost portion of the holding tank 10 will be pumped into the settling tank 44 for holding and settling purposes. In the normal course of events the slurry located within the settling tank 44 will eventually settle out with the larger elements forming the cement components of the cement gradually settling to the bottommost portion in the area of the funnel shape forming the sump area 46. The settling action will leave subtancially clear liquid in the uppermost portion of the settling tank.

A skimmer 56 comprising a pour with a suitable screen acting as a filter is located inside the wall portion of the settling tank 44 and in the area below the action of the auger 48, but in the area of the clear liquid. Pipes 58 connect the skimmer 56 through the high pressure pumps associated with the jets 20 and 22 located within the shaker 14.

In operation the liquid and slurry collected in the sump area of the holding tank 10 is pumped into the settling tank 42 and allowed to settle out. The clear liquid formed in the uppermost portion of the settling tank 44 is collected by means of skimmer 56 and fed through pipes 58 to the high pressure jets 20 and 22, whenever the shaker system 14 is energized. In this manner recycled water is continually being used to clean the stone and sand from the slurry in a continuing action that does not waste water and which is used to help pump slurry from the holding tank 10 into the settling tank 44.

Over a period of time the cement and other matters held in solution will settle to the bottommost portion into the sump area 46 of the settling tank leaving the clear liquid in the uppermost portion in the area of the skimmer 56.

It is recognized that over a period of time certain amount of fluid is lost by way of evaporation, spillage, and for many other reasons. A source of water from suitable main is fed through a valve 60 which is used to replenish the water in the settling tank as the liquid level is drawn off and used in accordance with the principles of this invention.

The slurry consisting of cement and solution and located in the sump area 46 of the settling tank 44 is collected in the bottommost portion of the funnel area of the settling tank and fed by means of pump 62 to a controllable valve 64 located in an area that is accessible by cement trucks.

The slurry consisting of water and cement solution is then used by the cement trucks when forming a new charge of cement. And hence, the cement slurry may be reused for those construction jobs allowing recirculated cement.

According to today's technology, recirculated cement in slurry form has been shown to have lost only 2% of the strength content of the original cement mixture. The exact reason for this 2% loss in strength is not fully known; however, there is one theory which indicates that cement even in its purest form is actually composed of up to 21 separate and distinct ingredients and that the recycling process actually washes some of these ingredients out of the cement mix. There is one theory which indicates that approximately three to four of these special ingredients comprising the cement is lost in the slurry mix and hence, these lost ingredients count for the 2% loss in strength content of recycled cement compared to original cement.

Recognizing that the slurry is basically cement and water in solution, the yard master when recirculating slurry simply feeds a charge of slurry from valve 64 into the cement truck equal to the charge of water that would normally be used with the charge of sand and gravel making cement charge. The resulting mix fed to the cement truck, therefore, contains a slight excess of cement than called for in the original mix which can only result in advantage to the ultimate user.

In this manner, cement and slurry is recycled and reused by the yardmaster in setting up his charge for feeding the cement trucks.

By way of review, it can now be appreciated that the cement truck at the end of the day can now dump his remaining excess load onto the shaker at which time he may utilize recirculated water from controllable valve 66 which is connected through a suitable pump 68 to the skimmer 56 located within the settling tank 44. The pump 68 pumps the water from skimmer 56 to both the high pressure jets 20 and 22 associated with the shaker system 14 and to the controllable valve 66 which is available to the cement truck operator for charging his truck with water generally used for cleaning purposes.

The use of recycled water prevents the need of a continuous water supply being available at the end of the day, which water supply is usually supplied by a four inch main that is usually open and discharges onto the ground and eventually into the sewer when not being used. The described system, in addition, separates the stone from the sand and provides for means of accumulating these components to be reused by the yardmaster when preparing new cement charge for the cement trucks.

The recycled water and slurry is then collected in the settling tank 44 and made available to the yardmaster in preparing a new charge of cement for the next day's operation.

It would certainly be appreciated that the cost savings in men and equipment by eliminating wasted transportation to dump sites usually located far from the job site is enormous. In addition, the cement truck need only return from the job site to the yard where the truck is stored, thereby allowing the truck owner to obtain more utilization from his cement truck during a given working day since waiting time for dumping has been eliminated, driving time occasioned with trips to a dump site has been eliminated, wear and tear on the truck itself for nonproductive use has been eliminated and the raw material consisting of stone, sand, cement and water has been reclaimed and made fit for further use.

I claim:

1. A continuously operating portable and mobile cement recycling apparatus comprising:
   a shaker and high pressure water jet system for washing and collecting residue cement, water, sand and rock from cement trucks and separating said rock from said sand,
   a pair of movable belts one over the other for independently collecting and moving said rock and sand to different storage areas,
   a holding tank below said shaker and said movable belts and having an area in the bottommost portion for collecting cement slurry consisting of cement and water,
   an auger located in the bottommost portion of said tank for periodically moving said slurry and providing continuous operation of said holding tank,
   a settling tank communicating with said holding tank for receiving said slurry and having a sump area in the bottommost portion for settling said slurry and providing continuous operation of said settling tank,
   an auger located in said settling tank for periodically moving said slurry,
   a skimmer located in the uppermost portion of the settling tank for receiving liquid substantially free of cement and feeding said liquid to said high pressure jet system, and
   a pump for feeding said slurry located within the sump area of said settling tank to a loading area for supplying a charge of cement slurry to waiting cement trucks.

2. A portable and mobile material cement recycling apparatus according to claim 1 in which said shaker consists of a first screen having a mesh for holding rock and a second screen located immediately beneath said first screen and having a mesh for collecting sand.

3. A portable and mobile cement recycling apparatus according to claim 2 in which a high pressure jet system is located over each of said screens and forces the rock from the upper screen onto the first belt and the sand accumulated on the lowermost screen onto the second belt.

4. An apparatus for continuously recycling stone, sand, cement, and water from a residue batch of cement mix comprising:
   a shaker having a plurality of different screens one above the other for holding rock and sand respectively and receiving a residue batch of cement mix from a cement truck,
   high pressure water jets adjacent each of said different screens for cleaning and separating said rock and said sand on each of said screens,
   a plurality of movable conveyor belts one adjacent each screen for catching and removing said rock and sand respectively,
   a holding tank located substantially below said shaker for catching all liquid and cement slurry,
   an auger located at bottommost portion of said holding tank for periodically moving said slurry and providing continuous operation of said holding tank,
   a settling tank communicating with said holding tank for receiving said liquid and slurry,
   an auger located in said settling tank for periodically moving said slurry and providing continuous operation of said settling tank, and
   a skimmer located at the uppermost portion of said settling tank for removing substantially clear liquid and feeding said liquid to said high pressure jets.

5. A continuously operating portable and mobile cement recycling apparatus comprising:
   a shaker having different size screen mesh openings and a high pressure water jet system for collecting and separating residue cement, water, sand and rock from cement trucks,
   a pair of movable conveyor belts one over the other for independently holding and transporting rock and sand to different storage bins,
   a holding tank for holding said shaker and said movable conveyor belts and having a sump area in the bottommost portion for collecting liquids and cement slurry,
   an auger located in said holding tank for periodically moving said slurry and providing continuous operation of said holding tank,
   a settling tank communicating with said holding tank for receiving said liquid and said slurry,
   an auger located in said settling tank for moving said slurry and providing continuous operation of said settling tank,
   a skimmer located in the liquid at the uppermost portion of said settling tank for receiving liquid substantially free of cement and feeding said liquid to said high pressure jet system,
   said liquid being available for externally cleaning cement trucks, and
   a pump for feeding said slurry to a loading area for supplying a charge of cement and liquid to waiting cement trucks.

* * * * *